April 20, 1926.

C. J. TROPPMAN 1,581,251

FOOT CLUTCH FOR LENS SURFACING MACHINES

Original Filed April 7, 1923     2 Sheets-Sheet 1

INVENTOR
Charles J. Troppman
BY
Harry H. Styll
ATTORNEY

April 20, 1926.  
C. J. TROPPMAN  
1,581,251  
FOOT CLUTCH FOR LENS SURFACING MACHINES  
Original Filed April 7, 1923   2 Sheets-Sheet 2

INVENTOR  
Charles J. Troppman  
BY  
Harry H. Styll  
ATTORNEY

Patented Apr. 20, 1926.

1,581,251

UNITED STATES PATENT OFFICE.

CHARLES J. TROPPMAN, OF CHICAGO, ILLINOIS, ASSIGNOR TO AMERICAN OPTICAL COMPANY, OF SOUTHBRIDGE, MASSACHUSETTS, A VOLUNTARY ASSOCIATION OF MASSACHUSETTS.

FOOT CLUTCH FOR LENS-SURFACING MACHINES.

Original application filed April 7, 1923, Serial No. 630,471. Divided and this application filed November 25, 1924. Serial No. 752,166.

*To all whom it may concern:*

Be it known that I, CHARLES J. TROPPMAN, a citizen of the United States, residing at Chicago, in the county of Cook and State of Illinois, have invented certain new and useful Improvements in Foot Clutches for Lens-Surfacing Machines, of which the following is a specification.

This invention relates to improvements in optical manufacturing machinery, and has particular reference to a clutch mechanism for use on such machinery.

In plants for the commercial surfacing of ophthalmic lenses, and particularly in plants wherein a large number of surfacing machines are in operation, it has been the custom to apply power to each individual machine by shifting a belt from a loose pulley to a fixed pulley, the fixed pulley being keyed to a constantly revolving shaft. This naturally results in the power being applied quite suddenly and is not only a source of annoyance to the operator, but also frequently causes damage to the work and machine parts.

It is, therefore, a most important object of my invention to provide a clutch mechanism adapted to be applied to the usual surfacing machine without necessitating a great amount of change in the construction thereof and by which power may be applied in a gradual manner.

A further object of my invention is the provision of a manually controlled clutch mechanism of the above mentioned character that may be shifted by the foot of the operator and will, therefore, be convenient at all times for starting or stopping the machine.

A still further object of my invention is the provision of a friction clutch for lens surfacing machines, in which the loose and the fixed elements will be engaged or disengaged through the medium of a manually operated cam, thereby insuring positive operation of the clutch at all times.

Other objects and advantages of my invention will become apparent during the course of the following description taken in connection with the accompanying drawings, wherein like numerals are employed to designate corresponding parts throughout all views of the same.

The subject matter of this invention is disclosed in my copending application for lens grinding machines filed April 7, 1923, Serial Number 630,471, but is not claimed therein, the present application being a division of said application Serial Number 630,471.

Figure 1:
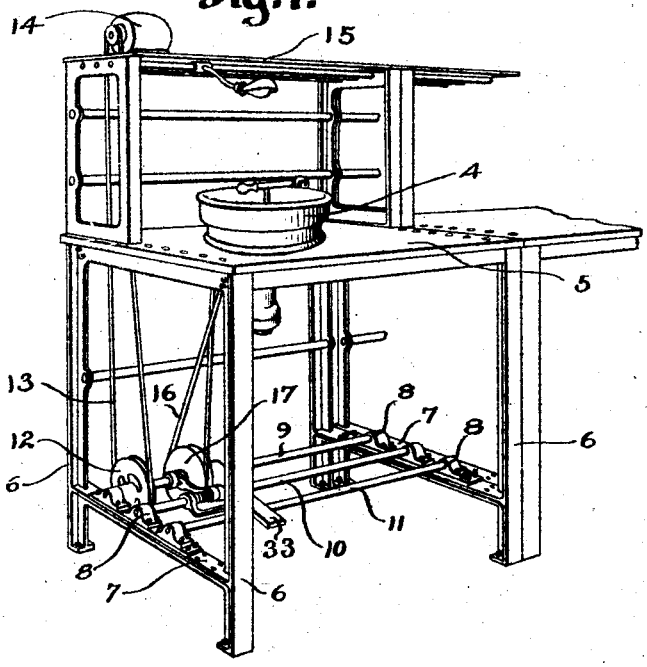
Figure 1 is a perspective view of a lens surfacing machine equipped with a clutch constructed according to my invention.
Figure 2:
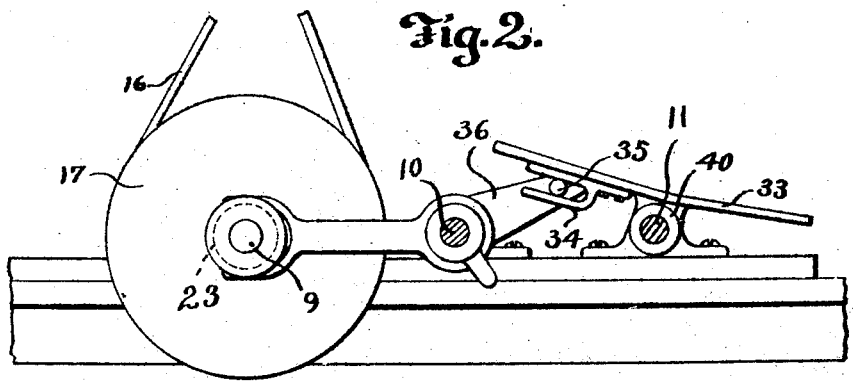
Figure 2 is a side elevation of the clutch per se.
Figure 3:
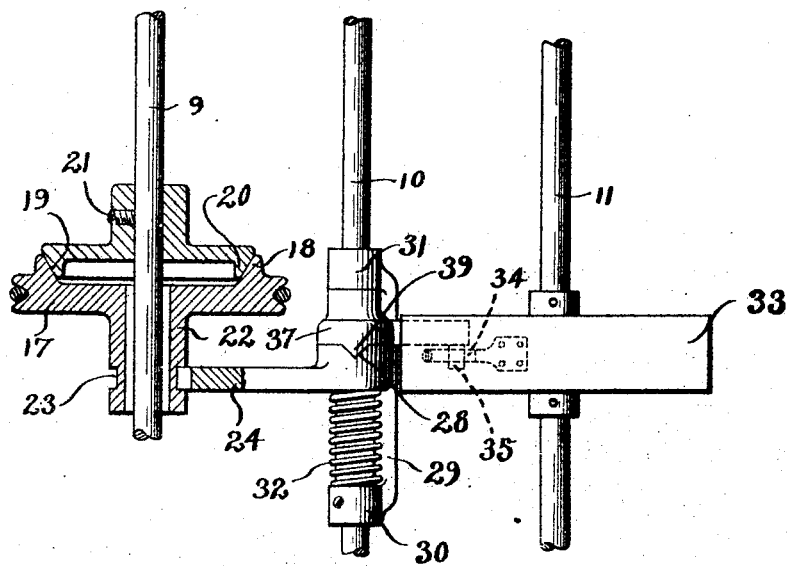
Figure 3 is a top plan view of the same partially in cross section to more clearly illustrate the clutch when in engagement.
Figure 4:
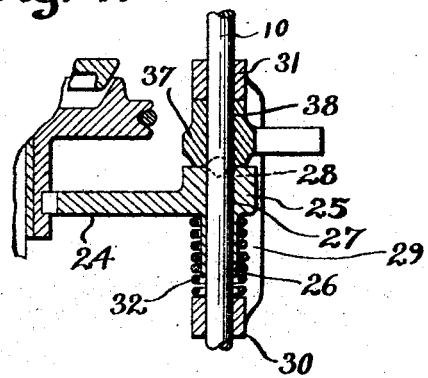
Figure 4 is a fragmentary view of the same with the clutch out of engagement.

Referring now particularly to the drawings, wherein I have shown the preferred embodiment of my invention, Figure 1 illustrates a machine provided with my novel clutch, said machine comprising a surfacing element 4, carried by a bench top 5, the said bench top being supported by the legs 6. Adjacent the base of the legs 6, but spaced therefrom are transversely extending braces 7, to which are detachably secured the castings 8 forming bearings for the longitudinally extending parallel shafts 9, 10 and 11.

The shaft 9 is kept constantly rotated by means of a pulley 12 rigidly mounted thereon, said pulley 12 being driven through the medium of a belt 13, and motor 14 mounted above the surfacer 4 on a shelf 15. Power for the surfacer 4 is obtained from the shaft 9 by means of a belt 16 driven by a pulley 17, said pulley 17 being loosely mounted on the shaft 9 and rotated or released as desired by the operation of my improved clutch, which I shall now proceed to describe in detail.

The pulley 17, loosely mounted on the shaft 9, is provided on one side with an extension 18 having a tapered counter bore 19, into which fits a correspondingly tapered clutch member 20, which is keyed to the shaft 9 by means of the clamping screw 21. The opposite side of the pulley 17 is provided with a boss 22 having an annular groove 23 adjacent its end to receive a shifting fork 24. The opposite end of the shifting fork 24 is provided with a head 25 internally bored as at 27 and provided on one side with a sleeve 26, whereby it is supported on the shaft 10. The opposite side of the head 25 is provided with a V-shaped notch 28 for a purpose to be hereinafter more fully described. Rigidly clamped on the shaft 10, and spaced apart, although integrally united by the raised tie bar 29, are two bushings 30 and 31, respectively, between which the said shifting fork 24 is slidably mounted. Mounted between the head 25 and the bushing 30, and surrounding the sleeve 26 is a helical spring 32 tending to force the head 25 away from the bushing 30 and toward the bushing 31. The shaft 11 spaced from and parallel to the shaft 10 has pivotally mounted thereon by means of a pivot joint 40, a foot pedal 33, said foot pedal carrying on its under side a yoke member 34. Slidably mounted in the yoke member 34 by means of a pin 35 is a lever 36 provided at its opposite end with a head 37, bored as at 38 to receive the shaft 10, on which it is pivotally mounted between the bushing 31 and the head 25 of the shifting fork 24. This head 37 of the lever 36 is provided on its side adjacent the shifting fork head 25 with a V-shaped tongue 39 adapted to engage with the previously described V-shaped notch 28 in the said shifting fork head 25.

From the foregoing description it will readily be apparent that by rocking the foot pedal 33 about the shaft 11 on the pivot joint 40, the pin 35 sliding in the yoke 34 will be raised or lowered. By this means the lever 36 will be rocked on the shaft 10, and the high point of the cam 39 will be moved out of the notch 38, thus shifting the head 25 against the tension of the spring 32. The shifting of the head 25 is conveyed to the fork 24 whereby the loosely mounted driving pulley 17 is shifted out of engagement with the clutch member 20. To again throw the clutch into engagement it is only necessary to shift the tongue 39 into engagement with the notch 28 by means of the foot pedal 33, whereby the helical spring 32 will force the counterbore 19 into engagement with the clutch member 20.

It will thus be seen that I have produced a clutch mechanism especially adapted for use on a lens surfacing machine and whereby power may be applied to the said machine in a desired gradual and positive manner. While I have illustrated and described but one form of my invention, which I desire to consider as the preferred embodiment of the same, it is to be understood that I reserve the right to make minor departures therefrom in so far as I remain within the spirit of my invention and the scope of the appended claims.

Having thus described my invention, I claim:

1. In a machine of the character described, a shaft, a cone faced clutch member secured to the shaft, an idler having a cone face slidably mounted on the shaft, a second shaft, an arm slidably mounted on the second shaft loosely engaging the idler, a lever having a cam face pivotally mounted on the second shaft, said cam face engaging the arm to move it longitudinally on the second shaft when the lever is rocked on its pivot, a third shaft and a pedal pivotally mounted on the third shaft and loosely engaging the lever to rock it on its pivot when the pedal is rocked on its pivot.

2. In a machine of the character described, a shaft, a cone faced clutch member secured to the shaft, an idler having a cone face slidably mounted on the shaft, a second shaft, an arm slidably mounted on the second shaft and loosely engaging the idler, a spring pressing against said arm and adapted to engage said idler with the cone faced clutch member, a lever having a cam face pivotally mounted on the second shaft, said cam face engaging the arm to move it longitudinally on the second shaft against the tension of the spring when the lever is rocked on its pivot, a third shaft and a pedal pivotally mounted on the third shaft and loosely engaging the lever to rock it on its pivot when the pedal is rocked on its pivot.

3. In a device of the character described, a shaft, a clutch member secured to the shaft, an idler having a face adapted to frictionally engage the clutch member slidably mounted on the shaft, a second shaft parallel to the first, an arm slidably mounted on the second shaft and loosely engaging the idler, a spring pressing against said arm to engage the idler and clutch member, a lever having a cam face pivotally mounted on the second shaft, said cam face engaging the arm to move it longitudinally on the second shaft against the tension of the spring when the lever is rocked, and a pivotally mounted pedal lever having one arm engaging the cam face lever to rock it when the other arm is pressed by the foot.

4. In a device of the character described, a shaft, a clutch member secured to the shaft, an idler having a face adapted to frictionally engage the clutch member slidably mounted on the shaft, a second shaft parallel to the first, an arm slidably mounted on the second shaft and loosely engaging the idler, a spring pressing against said arm to engage the idler and clutch member, a lever having a cam face pivotally mounted on the second shaft, said cam face engaging the arm to move it longitudinally on the second shaft against the tension of the spring when the lever is rocked, a pin on the cam face lever and a pivotally mounted pedal lever having a yoke on one arm engaging the pin on the cam face lever to rock the cam face lever when the other arm of the pedal is pressed by the foot.

CHARLES J. TROPPMAN.